United States Patent [19]

Schaff, Jr.

[11] 4,411,158
[45] Oct. 25, 1983

[54] APPARATUS FOR SENSING THE CONDITION OF A FLUID

[75] Inventor: Alfred Schaff, Jr., Marina Del Rey, Calif.

[73] Assignee: Ametek, Inc., New York, N.Y.

[21] Appl. No.: 254,114

[22] Filed: Apr. 14, 1981

[51] Int. Cl.³ .............................................. G01L 9/06
[52] U.S. Cl. .............................. 73/721; 73/DIG. 4; 73/727; 338/4
[58] Field of Search ................ 73/721, 720, 727, 726, 73/DIG. 4; 338/4

[56] References Cited

U.S. PATENT DOCUMENTS

| | | | |
|---|---|---|---|
| 3,455,165 | 7/1969 | Huet | 73/727 |
| 3,762,208 | 10/1973 | Bice et al. | 73/721 |
| 3,764,950 | 10/1973 | Wallia | 338/2 |
| 3,820,401 | 6/1974 | Lewis | 73/398 AR |
| 3,918,019 | 11/1975 | Nunn | 338/42 |
| 3,930,412 | 1/1976 | Mallon | 73/398 |
| 3,968,466 | 7/1976 | Nakamura | 338/42 |
| 4,023,562 | 5/1977 | Hynecek | 73/727 |
| 4,125,820 | 11/1978 | Marshall | 338/4 |
| 4,204,185 | 5/1980 | Kurtz | 338/4 |
| 4,291,293 | 9/1981 | Yamada | 73/727 |

*Primary Examiner*—Donald O. Woodiel

[57] ABSTRACT

An apparatus for sensing the condition of a pressurized fluid including a semiconductor chip having a diaphragm portion adapted for exposure to the pressurized fluid and an adjacent terminal portion adapted for connection to external circuitry for providing a measurement of the condition of the fluid. The semiconductor chip has sensing elements formed within the diaphragm portion and conductor elements in electrical contact with the sensing elements formed within and extending from the diaphragm portion to the terminal portion. A fluid barrier is provided for isolating the diaphragm portion from the terminal portion to prevent the terminal portion from being exposed to the pressurized fluid, while permitting pressurized fluid to contact the diaphragm portion so that the condition of the pressurized fluid can be sensed.

7 Claims, 6 Drawing Figures

FIG. 1.
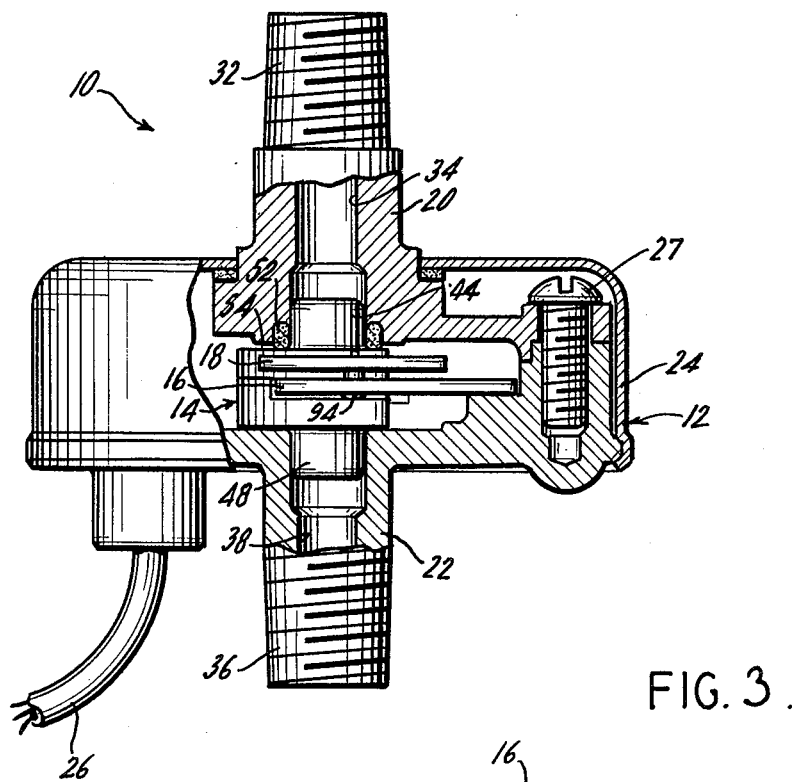
FIG. 2.
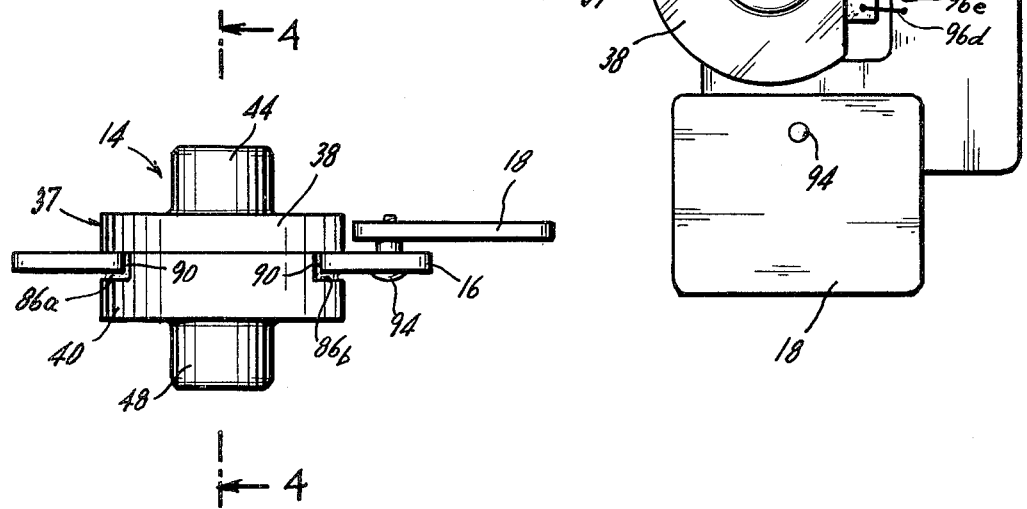
FIG. 3.

APPARATUS FOR SENSING THE CONDITION OF A FLUID

BACKGROUND OF THE INVENTION

This invention relates to an apparatus for measurement of the condition in a pressurized fluid and, in particular to such an apparatus adapted for measurement of absolute or differential pressure of a fluid medium and is particularly suited to pressure measurement of corrosive fluids. More specifically, this invention relates to a monocrystalline silicon chip, having a central diaphragm portion with integral semi-conductor strain gauges arranged in a Wheatstone bridge circuit for sensing, for example, pressure and a remote terminal portion for interconnections between the integral semiconductor strain gauges and circuitry external to the chip. The chip is partially contained within a metal or plastic cartridge assembly, so that the diaphragm portion is situated within the central ported cavity of the cartridge assembly in communication with the fluid and the termination portion extends to the outside of the cartridge assembly. Since the remote terminal portion and associated interconnections to external circuitry are isolated from the fluid and therefore cannot be damaged or corroded under the influence thereof. The cartridge assembly is mounted within a housing assembly having fluid couplings for convenient connection with a source of pressurized fluid.

Silicon chip sensors, such as pressure sensors, have been long known in the art, but their general acceptance and usefulness in pressure sensing applications have been considerably restricted due to their incompatability with most working fluids. For example, in the prior art pressure sensor chips disclosed in U.S. Pat. No. 3,764,950 to Wallia; U.S. Pat. No. 3,820,401 to Louis; U.S. Pat. No. 3,930,412 to Mallon et al.; and U.S. Pat. No. 3,918,019 to Nunn, the connections between the chip and external circuitry for power and output signal sensing are subject to exposure to the pressurized fluid. Since these connections to external circuitry are conventionally made by ultrasonic or other bonding of fine aluminum or gold wire, typically having a diameter of 0.001 to 0.003 inches, to metallized pads which are fused to the chip, they are extremely vulnerable and fragile. In the prior art, these wires and metallized pads are fully exposed to the fluid whose pressure is being measured. This fluid may mechanically damage the delicate wires through hydraulic forces or corrode the wires and metallized pads through chemical action. Moreover, it is not uncommon for the fluids to be sufficiently conductive to provide electrical shorting paths between the wires and metal pads which degrade or nullify the pressure sensing circuitry. Attempts have been made in the prior art to coat the wires and chip surfaces with insulating organic materials or other coatings. These coatings are unsatisfactory, since they may damage the connections due to their high thermal coefficients of expansion or may themselves degrade due to high temperature. Such coatings may also negatively affect the sensitivity of the diaphragm portion of the silicon chip.

SUMMARY OF THE INVENTION

The present invention overcomes the limitations associated with prior sensing chips by providing an apparatus in which all connections to circuitry external to the sensor chip are isolated from contact with or influence by the pressurized fluid. Since the pressurized fluid is exposed only to inert silicon or silicon oxide portions of the pressure sensor chip and to other portions of the apparatus which are unaffected by hydraulic, chemical, or thermal characteristics of the pressurized fluid, the apparatus avoids the deleterious impact of the pressurized fluid associated with prior art pressure sensor chips.

Accordingly, it is an overall object of the present invention to provide a pressure sensing apparatus which may be utilized to sense pressure of corrosive, high temperature and/or high pressure fluids without corrosion or other degradation of the apparatus under the influence of the fluid.

It is a further object of this invention to provide a pressure sensor apparatus in which all connections to external circuitry are isolated from the corrosive or degrading influence of the fluid whose pressure is being measured.

It is still a further object of this invention to provide a pressure sensor apparatus in which the pressurized fluid is exposed only to inert silicon or silicon oxide portions of the pressure sensor chip and other portions of the apparatus which are essentially immune to the chemical, hydraulic or temperature effects of the fluid whose pressure is being measured.

It is yet a further object of this invention to provide a pressure sensor apparatus wherein the pressure sensor chip includes a remote terminal portion for interconnection of the integral semi-conductor strain gauges of the chip with circuitry external to the chip.

In accordance with the present invention, there is provided a silicon sensor chip having a central diaphragm portion with integral semi-conductor sensing elements, adapted for exposure to pressurized fluid, and a remote terminal portion isolated from the influence of the pressurized fluid and adapted for interconnection wih external circuitry. In a particular illustrative embodiment demonstrating objects and features of the present invention, the chip is partially enclosed within a cartridge assembly isolating the terminal portion from the diaphragm portion. The cartridge assembly and partially enclosed pressure sensing chip are held within a housing assembly having fluid couplings for connection with a source of the fluid whose pressure is to be sensed. Connections from the chip to external circuitry are made at the terminal portion of the chip which is isolated from the influences of the pressurized fluid by the cartridge assembly. The external circuitry may include a temperature compensating circuit and/or signal conditioning circuit which may be contained on auxiliary current boards located within the housing assembly, but external to the cartridge assembly.

BRIEF DESCRIPTION OF THE DRAWINGS

The above objects, aspects, and advantages of the invention, as well as others, will be apparent from the detailed description of the preferred embodiment of the invention considered in conjunction with the drawings, which should be considered in an illustrative and not in a limiting sense, as follows:

FIG. 1 is an elevational view of the pressure sensing apparatus of the present invention showing the housing assembly in partial cutaway, the cartridge assembly with the partially enclosed pressure sensor chip, and the external temperature compensating and signal conditioning circuit boards;

FIG. 2 is an elevational view of the cartridge assembly and associated temperature compensation and signal conditioning circuit boards;

FIG. 3 is a plan view of the cartridge assembly with associated temperature compensator and signal conditioning circuit boards, showing the connections from the pressure sensing chip to the external circuitry;

DETAILED DESCRIPTION OF THE PREFERRED EMBODIMENT OF THE INVENTION

Figure 4:
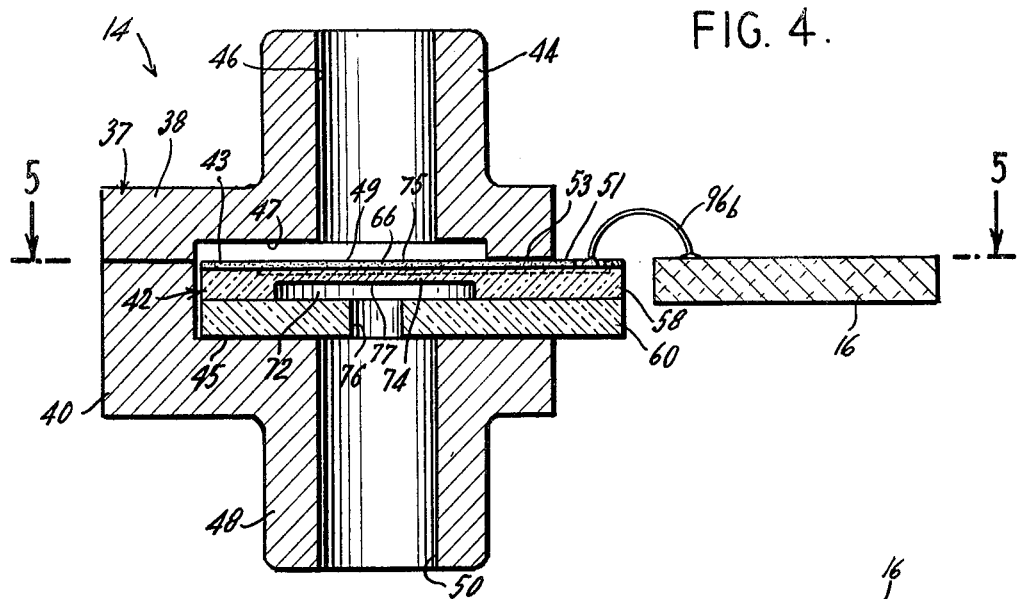
FIG. 4 is a section of the cartridge assembly and associated temperature compensation circuit board taken on line 4—4 of FIG. 2, looking in the direction of the arrows.

Referring to FIG. 1, a complete pressure sensing apparatus 10 including a housing assembly 12, a cartridge assembly 14, a temperature compensator circuit board 16 and a signal conditioning circuit board 18 is shown. The housing assembly 12 includes a high pressure hub 20, a low pressure hub 22, a protective cover 24 and an output cable 26. The high pressure hub 20 is fastened to the low pressure hub 22 by three screws 27, only one of which is shown. The protective cover 24 is securely held in position over the high pressure hub 20 by crimping to a box 28 integral with low pressure hub 22. A gasket 30 forms a seal between the protective cover 24 and the high pressure hub 20.

The high pressure hub 20 is provided with an externally screw threaded coupling portion 32 and a high pressure fluid inlet port 34. An analogous externally threaded coupling portion 36 and a low pressure fluid inlet port 38 are provided for the low pressure hub 22. The threaded coupling portions 32 and 36 readily permit connection of the pressure sensing apparatus 10 to sources of pressurized fluid.

Referring to FIGS. 2 and 4, there is seen the cartridge assembly 14, including a cartridge 37, having a cartridge cap 38 and a cartridge base 40; and a pressure sensor chip 42, having a high pressure surface 43 and a low pressure surface 45. The cartridge cap 38 includes a cavity 47 which is suitably shaped to receive the pressure sensor chip 42. The pressure sensor chip 42 includes an interior diaphragm portion 49 adapted for exposure to and measurement of the pressurized fluid, and an adjacent terminal portion 51 isolated from the influence of the pressurized fluid and adapted for interconnection with circuitry external to the pressure sensor chip 42. Since all connections to external circuitry are isolated from the pressurized fluid, such connections are immune from the degrading effects of the fluid.

The pressure sensor chip 42 is housed within the cartridge 37 which provides an effective fluid barrier between the interior diaphragm portion 49 and the terminal portion 51. The pressure sensor chip 42 is sealed to the cartridge base 40 along its low pressure surface 45. The cartridge cap 38 is sealed to both the cartridge base 40 and to the pressure sensor chip 42 along its high pressure surface 43, to partially enclose the pressure sensor chip 42. Sealing is accomplished through the use of a conventional cement which effectively forms a fluid barrier 53 dividing the pressure sensor chip 42 into the interior diaphragm portion 49 and the exterior terminal portion 51.

The cartridge cap 38 includes a coupling portion 44 and a high pressure fluid inlet port 46. Similarly, the cartridge base 40 includes a coupling portion 48 and a low pressure fluid inlet port 50. As seen in FIG. 1, the coupling portion 44 of the cartridge cap 38 snugly fits within the high pressure fluid inlet part 38 of the high pressure hub 20, while the coupling portion 48 of the cartridge base 40 fits snugly within the low pressure fluid inlet port 38 of the low pressure hub 22. An O-ring 52 is provided between the high pressure hub 20 and the cartridge cap 38 which acts both as a fluid seal and as a flexible spacer to maintain a suitable gap 54, for preventing stress on the cartridge assembly 14 by thermal expansion and contraction of the housing assembly 12. Thus, a continuous sealed path is provided through the high pressure fluid inlet port 34 of the high pressure hub 20 and the high pressure fluid inlet port 46 of the cartridge cap 38 for impingement of high pressure fluid on the high pressure surface 43 of the diaphragm portion 49 of the pressure sensor chip 42.

A similar continuous sealed path is provided through the low pressure fluid inlet port 38 of the low pressure hub 22 and the low pressure fluid inlet port 50 of the cartridge base 40 for impingement of low pressure fluid on the low pressure surface 45 of the diaphragm portion 49 of the pressure sensor chip 42.

Figure 5:
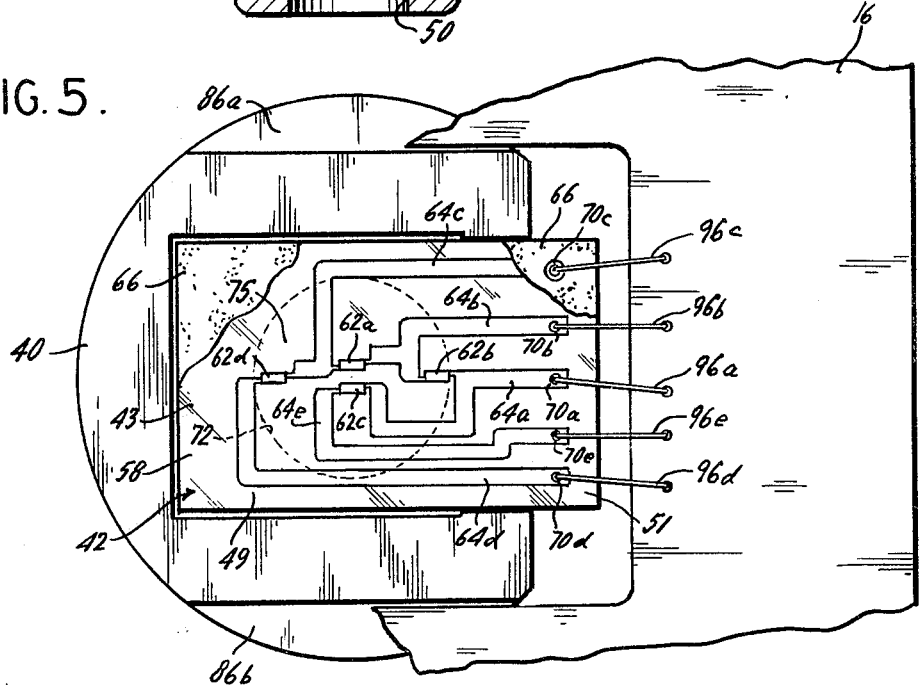
FIG. 5 is an enlarged section of the cartridge assembly taken on line 5—5 of FIG. 4, looking in the direction of the arrows, and showing in partial cutaway the pressure sensor chip.

As best seen in FIGS. 4 and 5, the pressure sensor chip 42 includes a sensitized chip 58 attached to a restraining chip 60, preferably using conventional methods, such as cement, fused glass, or electrostatic bonding. The restraining chip 60, while not essential to the functioning of the sensitized chip 58, provides stability to the sensitized chip 58 by forming a reinforcing box structure. The sensitized chip 58 and restraining chip 60 may be produced by a conventional planar semi-conductor process in a wafer form such that many chips are produced at a time and each chip is then cut from the wafer.

The sensitized chip 58 includes strain gauge resistors 62a, 62b, 62c, and 62d and conductors 64a, 64b, 64c, 64d, and 64e, forming a Wheatstone bridge circuit, which may be diffused into the basic silicon wafer or chip by conventional planar diffusion or ion implantation. The diffusion process includes the growing of a protective layer of silicon oxide 66 over the diffused or implanted areas. The conductors 64a, 64b, 64c, 64d, and 64e extend from the diaphragm portion 49 to the terminal portion 51 and are in substantially parallel arrangement within the terminal portion 51. By means of photolithography and etching, contact areas 70a, 70b, 70c, 70d, and 70e are opened in the silicon oxide layer 66 of the terminal portion 51 to expose the terminations of the diffused conductors 64a, 64b, 64c, 64d, and 64e. These contact areas 70a, 70b, 70c, 70d, and 70e are coated with a metal—for example, aluminum—and alloyed to the conductors 64a, 64b, 64c, 64d, and 64e to form ohmic contacts to the conductors.

An inherent characteristic of the strain gauge resistors 62a, 62b, 62c, and 62d is the variation in their resistance with changes in temperature. This variation, called the temperature coefficient of resistance, is generally positive, i.e., increases in temperature cause increases in resistance. This temperature coefficient of resistance is generally predictable and linear or nearlinear for operating temperatures at or below 125° C.

However, at temperatures above 125° C. the temperature coefficient of resistance of the strain gauge resistors 62a, 62b, 62c, and 62d is generally drastically reduced or becomes negative. To balance this drastic change in the temperature coefficient of resistance at temperatures above 125° C., the conductors 64a, 64b, 64c, 64d, and 64e may be more heavily diffused than the strain gauge resistors 62a, 62b, 62c, and 62d, and formed with a relatively large area and low length to width ratio. By selecting an appropriate geometry and diffusion for the conductors 64a, 64b, 64c, 64d, and 64e, their temperature coefficient of resistance may be established at a value greater than that of the strain gauge resistors 62a, 62b, 62c, and 62d, especially at temperatures above 125° C. For example, the conductors may have an area of 30 squares, width of 0.001 inch, and an average carrier concentration of $10^{20}$ per cubic centimeter, while the strain gauge resistors may have an area of 200 squares, a width of 0.0005 inch, and an average carrier concentration of $10^{18}$ per cubic centrimeter. In this way, the temperature range exhibiting a positive linear or near-linear temperature coefficient of resistance for the sensor chip 42 can be extended from approximately 125° C. to over 200° C.

The sensitized chip 58 includes a cavity 72 (FIG. 4) within the diaphragm position 49, which forms a diaphragm 74 under the strain gauge resistors 62a, 62b, 62c, and 62d. The diaphragm 74 has a high pressure surface 75, forming a portion of the overall high pressure surface 43 of the pressure sensor chip 42, and a substantially opposing low pressure surface 77. The cavity 72 and the resultant diaphragm 74 are shown as circular, but may be square, rectangular, or any other shape deemed best for the particular output characteristics desired. Similarly, the thickness of the diaphragm 74 is conventionally chosen to obtain the desired output characteristics of the pressure sensor chip 42. The cavity 72 may be formed by etching away the sensitized chip 58 or, alternatively, the sensitized chip 58 may itself be a laminate of a thin chip joined to an intermediate chip having a hole of the desired size and shape to form the desired diaphragm. The restraining chip 60 is shown with a vent hole 76, but, depending upon the desired measurements, may be formed as a continuous layer having no holes whatsoever.

As best seen in FIGS. 2 and 5, the cartridge body 40 includes a pair of notches 86a and 86b into which temperature compensator circuit board 16 is placed and firmly affixed by epoxy 90. Signal conditioner board 18 is in turn affixed to temperature compensator board 16 by a rivet 94.

As best viewed in FIGS. 4 and 5, all electrical connections between the pressure sensor chip 42 and circuitry external to the chip is made through wire bonds 96a, 96b, 96c, 96d, and 96e to temperature compensator board 16. In a conventional manner, electrical interconnection is made from the temperature compensator circuit board 16 and the signal conditioning circuit board 18 to an external power source and instrumentation by the output cable 26. Since wire bonds 96a, 96b, 96c, 96d, and 96e are external to cartridge assembly 14, they are uninfluenced by the chemical, hydraulic, and temperature effects of the pressurized fluid impinging upon the diaphragm portion 82 of pressure sensitive chip 42. Accordingly, the pressurized fluid is exposed only to inert silicon or silicon oxide portions of the pressure sensor chip 42 and other portions of the pressure sensor apparatus 10 which are essentially immune to the chemical, hydraulic or temperature effects of the fluid whose pressure is being measured.

Figure 6:
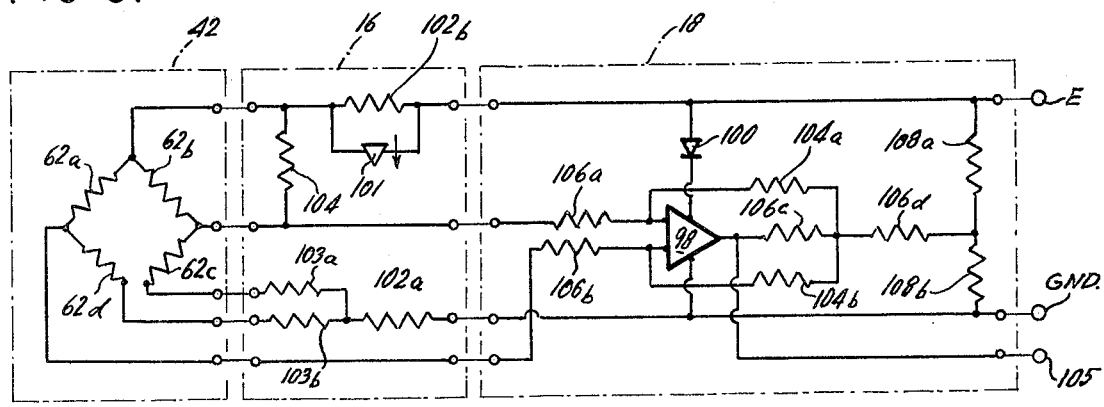
FIG. 6 is a schematic diagram of the circuitry of the pressure sensor chip, the temperature compensating circuit board, and the signal conditioning circuit board.

FIG. 6 illustrates in schematic form the electrical circuitry for the pressure sensor apparatus 10. Electrical power is applied to the circuit through output cable 26 for activating the operational amplifier 98, and the Wheatstone bridge network made up of the strain gauge resistors 62a, 62b, 62c, and 62d. The operational amplifier 98 is protected against inverted power polarity by diode 100. Linear or near-linear variations in resistance of the sensor chip 42 caused by temperature changes are compensated for by the resistor network contained on temperature compensator circuit board 16, consisting of a negative mode thermistor 101, series resistors 102a and 102b, and a shunt resistor 104. Resistors 103a and 103b are also provided on the temperature compensator circuit board 16 for balancing the Wheatstone bridge network in a conventional manner. The output signal of the Wheatstone bridge network is conditioned to drive a meter, microprocessor, or other control or display device 105 by operational amplifier 98 and its associated network of feedback resistor 104a and 104b, series resistors 106a, 106b, 106c, and 106d, and bias resistors 108a and 108b.

The pressure sensing apparatus 10 is suitable for measurement of either differential or absolute pressure of a fluid medium. When used for differential measurement, a source of high pressure fluid is vented through the high pressure fluid inlet port 34 of the high pressure hub 20 and a source of low pressure fluid is vented through the low pressure fluid inlet port 38 of the low pressure hub 22. The diaphragm 74 is thus deflected in proportion to the pressure differential between the high and low pressure fluids. This deflection results in a proportional change in the resistance of the strain gauge resistors 62a, 62b, 62c, and 62d which, in a conventional manner, varies the resistance of the Wheatstone bridge circuit and thus the input to and output of the operational amplifier 98. When used for measurement of absolute pressure, the low pressure fluid inlet port 38 of the low pressure hub 22 and the low pressure fluid inlet port 50 of the cartridge base 40 are evacuated and sealed by a suitable plug, not shown. The diaphragm 74 is thus deflected in proportion to the absolute pressure exerted by the fluid vented through the high pressure fluid inlet port 34 of the high pressure hub 20.

It should be understood that the embodiment described herein is only illustrative of the present invention. It should be recognized by those skilled in the art that, for example, the invention may also be practiced with other conventional bridge circuits or with a temperature or sound sensing chip. Accordingly, a latitude of modification, change, and substitution is intended in the foregoing disclosure. Accordingly, it is appropriate that the appended claims be construed broadly and in a manner consistent with the spirit and scope of the invention.

What I claim is:

1. An apparatus for sensing the condition of a pressurized fluid, comprising:
   a semiconductor chip having a diaphragm portion adapted for exposure to a pressurized fluid and an adjacent terminal portion adapted for connection to external circuitry for providing a measurement of the condition of the pressurized fluid, said semiconductor chip having sensing elements integrally formed within said diaphragm portion beneath a protective semiconductor layer, and conductor elements in electrical contact with said sensing elements, said conductor elements being integrally formed within said chip beneath said protective semiconductor layer and extending from said diaphragm portion to said terminal portion;

a housing having wall; and means for mounting said semiconductor chip with said housing with the walls of said housing spaced from said semiconductor chip, said mounting means cooperating with said housing to form a fluid barrier for confining the flow of said pressurized fluid into contact with said diaphragm portion and isolating said diaphragm portion from said terminal portion to prevent said terminal portion from being exposed to said pressurized fluid while permitting the pressurized fluid to contact said diaphragm portion so that the condition of the pressurized fluid can be sensed.

2. An apparatus for sensing the pressure of a fluid as claimed in claim 1, further comprising:

cable means operatively coupled to said semiconductor chip through said terminal portion, for transmitting electrical signals to and from said semiconductor chip.

3. An apparatus for sensing the pressure of a fluid as claimed in claims 1, wherein:

said strain sensing elements are strain gauge resistors arranged in a Wheatstone bridge.

4. Apparatus for sensing the condition of a fluid, comprising:

a semiconductor chip having a diaphragm portion which is adapted to be exposed to a fluid whose condition is to be sensed;

sensing elements integrally formed within said diaphragm portion of said semiconductor chip and beneath a protective semiconductor layer for sensing the condition of said fluid;

conductor elements integrally formed in said semiconductor chip beneath said protective semiconductor layer in electrical contact with said sensing elements in said diaphragm portion and extending from said diaphragm portion to a terminal portion whereat said conductor elements are adapted to be electrically connected to external means for deriving sensing signals from said sensing elements;

a housing having at least one fluid inlet port and walls; and means for mounting said semiconductor chip with said housing with the walls of said housing spaced from said semiconductor chip, so that said fluid inlet port receives and directs said fluid solely into said housing and into contact with the diaphragm portion of said semiconductor chip and fluid is prevented from contacting said terminal portion so as to preclude damage by said fluid to the connection between said semiconductor elements and said external means.

5. Apparatus for sensing the pressure of a fluid, comprising:

a semiconductor chip having a diaphragm portion which is adapted to be exposed to a medium whose pressure is to be sensed;

strain-sensing elements integrally formed in said semiconductor chip within said diaphragm portion and beneath a protective semiconductor layer;

conductor elements integrally formed in said semiconductor chip beneath a protective semiconductor layer in electrical contact with said strain-sensing elements in said diaphragm portion and extending from said diaphragm portion to a terminal portion whereat said conductor elements are adapted to be electrically connected to external means for deriving pressure sensing signals from said strain-sensing elements; and a cartridge assembly including a housing having at least one fluid inlet port and walls, said semiconductor chip being mounted in said housing with the walls of said housing spaced from said semiconductor chip, said fluid inlet port receiving fluid and causing said fluid to flow into contact with the diaphragm portion of said semiconductor chip containing said strain-sensing elements and a portion of the conductor elements, said terminal portion of the semiconductor chip being positioned outside of said cartridge assembly and isolated from the fluid in contact with the diaphragm portion to prevent damage to the electrical connection between the terminal portion and the external means.

6. Apparatus for sensing the pressure of a fluid, comprising:

a rigid support member;

a semiconductor chip having a diaphragm portion which is adapted to be exposed to a medium whose pressure is to be sensed mounted on said rigid support member;

strain-sensing elements integrally formed in said semiconductor chip within said diaphragm portion and beneath a protective semiconductor layer;

conductor elements integrally formed in said semiconductor chip beneath a protective semiconductor layer in electrical contact with said strain-sensing elements in said diaphragm portion and extending from said diaphragm portion to a terminal portion whereat said conductor elements are adapted to be electrically connected to external means for deriving pressure sensing signals from said strain-sensing elements; and a cartridge assembly including a housing having at least one fluid inlet port and walls, said semiconductor chip being mounted in said housing with the walls of said housing spaced from said semiconductor chip, said fluid inlet port receiving fluid and causing said fluid to flow into contact with the diaphragm portion of said semiconductor chip containing said strain-sensing elements and a portion of the conductor elements, said terminal portion of the semiconductor chip being positioned outside of said cartridge assembly and isolated from the fluid in contact with the diaphragm portion to prevent damage to the electrical connection between the terminal portion and the external means.

7. Apparatus for sensing the condition of a fluid, comprising:

a semiconductor chip having a diaphragm portion which is adapted to be exposed to a medium whose pressure is to be sensed, said semiconductor chip having a high pressure side adapted to be exposed to a fluid having relatively high pressure and a low pressure side adapted to be exposed to fluid having a relatively low pressure;

a cavity formed in the low pressure surface of said sensitized chip defining said diaphragm portion;

strain-sensing elements integrally formed in said semiconductor chip within said diaphragm portion and beneath a protective semiconductor layer;

conductor elements integrally formed in said semiconductor chip beneath said protective semiconductor layer in electrical contact with said strain-sensing elements in said diaphragm portion and extending from said diaphragm portion to a terminal portion whereat said conductive elements are adapted to be electrically connected to external means for deriving pressure sensing signals from said strain-sensing elements; and a cartridge assembly including a housing having at least one fluid inlet port and walls, said semiconductor chip being mounted in said housing with the walls of said housing spaced from said semiconductor chip, said fluid inlet port receiving fluid and causing said fluid to flow into contact with the diaphragm portion of said semiconductor chip containing said strain-sensing elements and a portion of the conductor elements, said terminal portion of the semiconductor chip being positioned outside of said cartridge assembly and isolated from the fluid in contact with the diaphragm portion to prevent damage to the electrical connection between the terminal portion and the external means.

* * * * *